United States Patent

Yuguchi

[15] 3,673,521

[45] June 27, 1972

[54] EQUALIZING TRANSMISSION LOSS UTILIZING GRAPHICAL METHOD FOR SELECTING EQUALIZER NETWORKS

[72] Inventor: Hiroshi Yuguchi, Yokohama, Japan

[73] Assignee: Kokusai Denshin Denwa Kabushiki Kaisha, Tokyo-to, Japan

[22] Filed: Jan. 11, 1971

[21] Appl. No.: 105,479

[30] Foreign Application Priority Data

Jan. 14, 1970 Japan....................................45/3729

[52] U.S. Cl. ..............................................333/28 R, 333/75

[51] Int. Cl.........................................H03h 7/14, H04b 3/14

[58] Field of Search ................................................333/28 R

[56] References Cited

UNITED STATES PATENTS

| | | | |
|---|---|---|---|
| 1,606,817 | 11/1926 | Stevenson | 333/28 R |
| 2,342,638 | 2/1944 | Bode | 333/28 R |
| 2,969,509 | 1/1961 | Bangert | 333/28 R |

*Primary Examiner*—Paul L. Gensler

*Attorney*—Robert E. Burns and Emmanuel J. Lobato

[57] ABSTRACT

In an attenuation equalizer used to make the total transmission loss of a transmission path essentially the same for all frequencies in the range being transmitted, a desired characteristic determined for compensating a distorted frequency characteristic of the transmission path to be equalized is divided into a plurality of equilateral triangles so that each characteristic of the equilateral triangles is realized by a unit circuit, such as a constant resistance circuit of second degree function type.

2 Claims, 5 Drawing Figures

EQUALIZING TRANSMISSION LOSS UTILIZING GRAPHICAL METHOD FOR SELECTING EQUALIZER NETWORKS

This invention relates to an attenuation equalizer used to make the total transmission loss of a transmission path essentially the same for all frequencies in the range being transmitted.

In forming an attenuation equalizer in accordance with conventional technique, (i) a desired characteristic for compensating a distorted frequency characteristic to be equalized is at first expanded as an orthogonal function, such as a cosine function or a sampling function, or as a combination of a plurality of folded lines (triangular-wave patterns) each having a constant amplitude, so that each of the expanded patterns is approximately realized as a unit circuit formed by circuit elements, such as resistances, inductances and capacitances; or (ii) a plurality of unit circuits each formed in accordance with experimental trial and error method are combined with each other to obtain a desired equalizing characteristic. In the former method, a number of unit circuits are necessary so that techniques are complicated. In the latter method, a predetermined principle is not employed so that design of a desired attenuation equalizer is very difficult.

An object of this invention is to provide an attenuation equalizer suitable for ready production without the abovementioned defects of the conventional arts.

In accordance with a feature of this invention, a desired characteristic for compensating a distorted frequency characteristic to be equalized is divided into a plurality of equilateral triangles as described below so that each characteristic of the equilateral triangles is realized by a unit circuit, such as a constant resistance circuit, formed by circuit elements, such as resistances, inductances and capacitances.

The invention will be better understood from the following more detailed discussion taken in conjunction with accompanying drawings, in which.

Figures 1A, 1B, 2, 3:
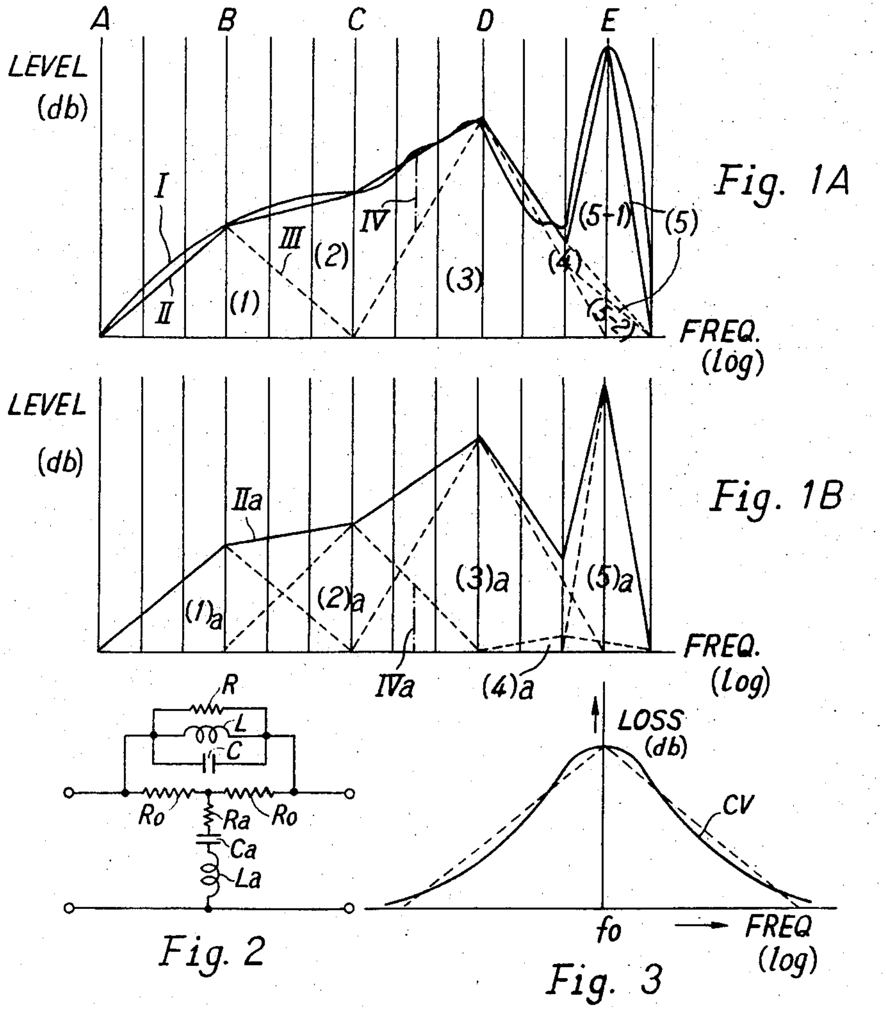
FIGS. 1A and 1B are characteristic diagrams explanatory of a case of dividing a desired equalizing characteristic into a plurality of equilateral triangles to realize an attenuation equalizer of this invention.
FIG. 2 is a circuit diagram illustrating an example of a constant resistance circuit which is employed for realizing a characteristic corresponding to one of divided equilateral triangles.
FIG. 3 is a characteristic diagram explanatory of the characteristic of the circuit shown in FIG. 2.
Figure 4:
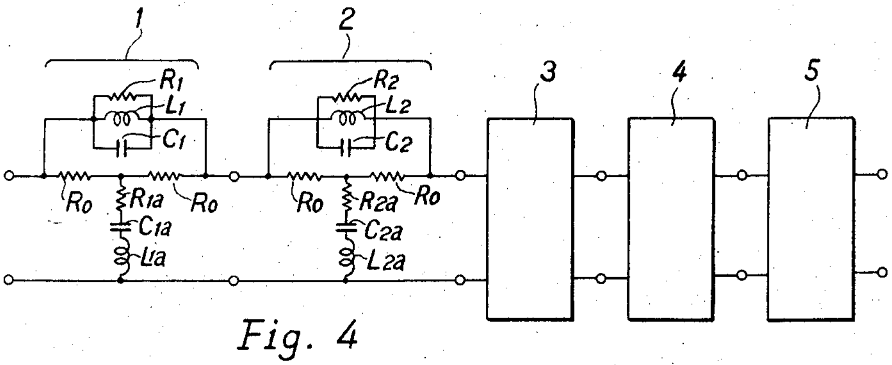
FIG. 4 is a connection diagram illustrating an embodiment of this invention.

With reference to FIGS. 1A and 1B, the division principle of a desired equalizing characteristic performed in accordance with this invention will first be described. The desired equalizing characteristic I predetermined for compensating a distorted frequency characteristic to be equalized is shown in FIG. 1A by the use of a logarithmic scale for the abscissa and divided into a number of parts by the use of dividing lines which are allocated at equal intervals determined in accordance with the degree of complexity of the unevenness of the desired equalizing characteristic I, so that the desired equalizing characteristic I approximates a folded line II whose turning points are positioned on the dividing lines. An area enclosed by this folded line II and the abscissa can be divided into triangles and/or quadrangles (1), (2), (3), (4) and (5) whose apexes are located on the dividing lines. In this case, three apexes of a triangle (e.g.; a triangle (1)) are positioned on the dividing lines (e.g.; A.B.C.) allocated at the same intervals. With respect to a quadrangle (e.g.; a quadrangle (2)), two apexes are positioned on a center one (C) of three dividing lines (e.g.; B.C.D) located at the same intervals while the other two apexes are respectively positioned on a left one (B) and right one (D) of the three dividing lines (B,C,D). The triangles (1), (3) and (5) (i.e.; (5–1) and (5–2)) and the quadrangles (2) and (4) can be respectively converted to equilateral triangles (1)*a*, (5)*a*, (2)*a* and (4)*a* which have respectively the same areas as corresponding ones of the areas (1), (3), (5), (2) and (4). In other words, a folded line II*a* obtained by a total sum of these equilateral triangles (1)*a*, (2)*a*, (3)*a*, (4)*a* and (5)*a* is equivalent to the folded line II. In this conversion, respective vertical heights (e.g.; IV and IV*a*) at the same frequency of two equivalent areas (e.g.; (2) and (2)*a*) are equal to each other. A desired equalizing characteristic can be divided into a number of different groups of equilateral triangles. However, it is desirable for the number of equilateral triangles to be as small as possible to form an attenuation equalizer as mentioned below in an economical fashion. characteristic is Each of the converted equilateral triangles (1)*a*, (2)*a*, (3)*a*, (4)*a* and (5)*a* can be approximately realized, for example, by the use of a constant resistance circuit of second degree function type as shown in FIG. 2. In FIG. 3, a frequency characteristic CV of a constant resistance circuit shown in FIG. 2 is illustrated in comparison with an equilateral triangle shown by dotted line. As understood from this illustration, approximation sufficiently suitable for practical use can be obtained by a unit circuit, such as a constant resistance circuit. A desired equalizing is realized, as shown in FIG. 4, by a successive cascade connection of a plurality of unit circuits (e.g.; constant resistance circuits of second degree function type) respectively corresponding to the converted equilateral triangles.

As mentioned above, the attenuation equalizer of this invention is constructed in accordance with a principle quite different from conventional arts. Moreover, the attenuation equalizer can be realized by arranging a plurality of unit circuits having the same formation at intervals determined in accordance with the complexity of the unevenness of the desired equalizing characteristic. Accordingly, the number of element circuits can be sufficiently reduced in comparison with that of the conventional equalizer of orthogonal function type etc., while precise approximation can be realized in accordance with this invention. Moreover, the attenuation equalizer of this invention can be readily designed by simple techniques, so that automatic design of a desired equalizing characteristic can be performed in accordance with this invention.

What I claim is:

1. A method of equalizing the transmission loss of a transmission path to make the total transmission essentially the same for all frequencies in the range of frequencies to be transmitted which comprises plotting the frequency transmission level characteristic curve of said transmission path with ordinates representing transmission level and abscissae plotted on a logrithmic scale representing frequency, plotting a corresponding but opposite frequency attenuation equalizing curve, dividing said equalizing curve into segments by a plurality of equally spaced vertical lines, drawing a graph approximating said equalizing curve but composed of a series of connected straight lines having their junction points on said dividing lines, dividing the area between said graph and the abscissa base line into a plurality of triangles or quadrangles having their apices located on said dividing lines at equal intervals, converting said triangles or quadrangles into corresponding equilateral triangles having respectively the same areas and the same vertical heights at the same frequencies, selecting a constant resistance circuit having a frequency characteristic curve approximating each of said equilateral triangles, and connecting said circuits with one another in a cascade connection.

2. A method according to claim 1, in which said constant resistance circuits are of a second degree function type.

* * * * *